United States Patent

[11] 3,590,282

[72] Inventor Raphael F. Ehat
Daly City, Calif.
[21] Appl. No. 810,266
[22] Filed Mar. 25, 1969
[45] Patented June 29, 1971
[73] Assignee The United States of America as represented by the Secretary of the Navy

[54] BLOCKING OSCILLATOR
4 Claims, 1 Drawing Fig.

[52] U.S. Cl. .......... 307/273, 307/288
[51] Int. Cl. .......... H03k 3/28
[50] Field of Search .......... 307/273, 288, 313, 266, 275

[56] References Cited
UNITED STATES PATENTS

| | | | |
|---|---|---|---|
| 2,896,094 | 7/1959 | Moody et al. | 307/288 |
| 3,065,362 | 11/1962 | Benson | 307/273 |
| 3,204,130 | 8/1965 | Hickey | 307/288 |

FOREIGN PATENTS

| | | | |
|---|---|---|---|
| 636,768 | 2/1962 | Canada | 307/273 |

*Primary Examiner*—John Kominski
*Attorneys*—Raymond I. Tompkins and Charles D. B. Curry

ABSTRACT: A blocking oscillator having a two stage amplifier feeding a two terminal inductive load. The blocking oscillator has a positive feedback, operative during the active period of the circuit, through a diode connected between the first and second amplifier stages. A load coil or inductance is connected to the output of the second stage. The circuit is initiated by the input pulse and is terminated by the maximum current increase in the load coil which inhibits the positive feedback and therefore turns off the first and the second stages.

PATENTED JUN 29 1971 3,590,282

Figure 1:
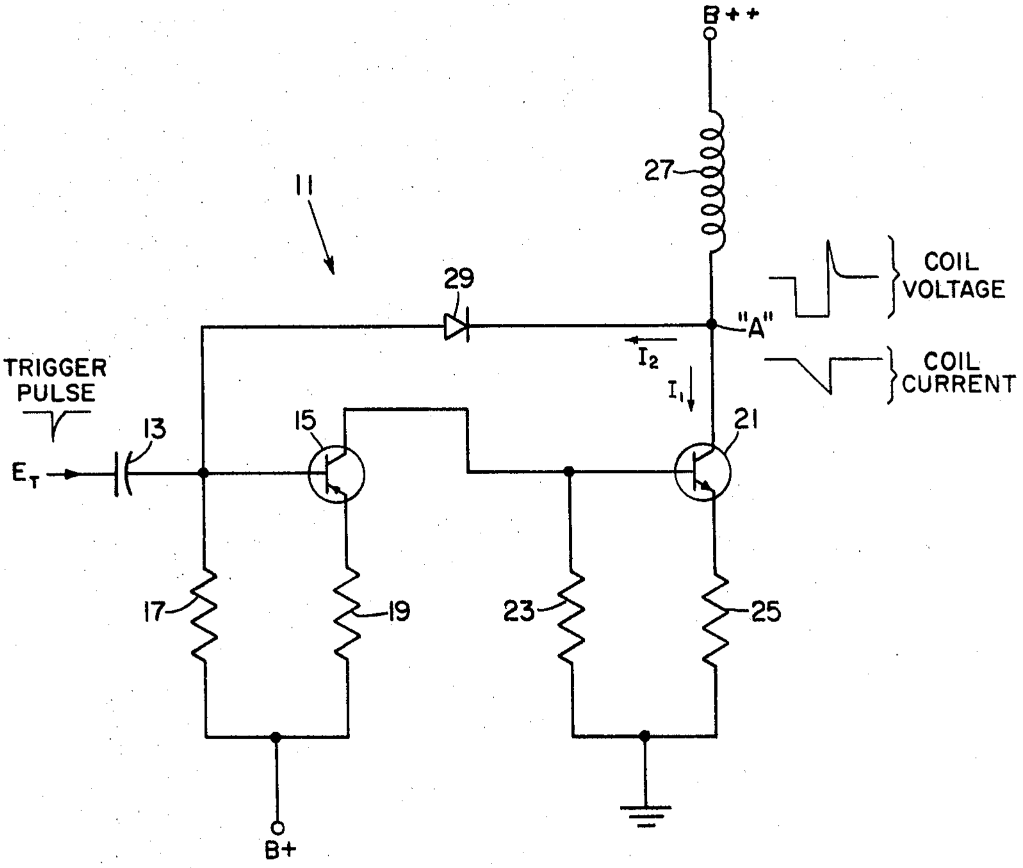

INVENTOR.
RAPHAEL F. EHAT
BY Charles E. B. Curry
ATTORNEY

BLOCKING OSCILLATOR

The invention described herein may be manufactured and used by or for the Government of the United States of America for governmental purposes without the payment of any royalties thereon or therefor.

The present invention relates to a blocking oscillator and more particularly to a blocking oscillator used to drive an electromechanical device such as a relay or a counter.

Conventional blocking oscillators require, in addition to the load coil of the driven electromechanical device, a transformer with multiple windings or at least a tapped winding. This enables the phasing of the feedback around the active element to be regenerative to sustain the half cycle of oscillation that constitutes the active period of the event initiated by an input trigger pulse. In these conventional devices the current pulse through the transformer winding is required to operate the load coil of the electromechanical device. It is necessary to time the duration of this pulse to suit the mechanical design of the electromechanical device which, in turn, is activated by motor action from the load coil. This requires a rather complex circuit and the use of a transformer winding with the blocking oscillator.

The present invention provides a much simpler means for driving the load coil of an electromechanical device. This is achieved by eliminating the blocking oscillator transformer and using the load coil of the electromechanical device as the blocking oscillator transformer.

Briefly, the present invention comprises a two stage amplifier feeding a two terminal inductive load employing a positive feedback during the active period of the blocking oscillator, through a diode connected between the first and second amplifier stages. A load coil or inductance is connected to the output of the second stage. The circuit is initiated by the input pulse and is terminated by the maximum current increase in the load coil which inhibits the positive feedback and therefore turns off the first and the second stages.

Other objects, advantages and novel features of the invention will become apparent from the following detailed description of the invention when considered in conjunction with the accompanying drawings wherein:

FIG. 1 is a schematic diagram of the blocking oscillator of the present invention.

In FIG. 1 is illustrated the blocking oscillator circuit 11 of the present invention. This circuit has a trigger pulse $E_T$ that is applied through capacitor 13 to the base of transistor 15. Resistors 17 and 19 are respectively connected to the base and emitter of transistor 15 and to B+ to set the operating points of the transistor. The collector of transistor 15 is connected to the base of transistor 21. Resistors 23 and 25 are respectively connected to the base and emitter of transistor 21 and to ground to set the operating points of transistor 21. The collector of transistor 21 is connected to one side of coil 27 and to the cathode of diode 29. The anode of diode 29 is connected to the base of transistor 15 to form a positive feedback from the collector of transistor 21 to the base of transistor 15. Coil 27 is the load and may be the coil of a relay or the like and has a coil voltage B++ applied as indicated in the drawing. The trigger pulse $E_T$ may have a shape as generally indicated in FIG. 1.

The operation of the circuit shown in FIG. 1 is as follows: The trigger pulse $E_T$ is applied to the base of transistor 15 which turns transistor 15 on. The amplified pulse at the collector of transistor 15 is applied to the base of transistor 21 which turns transistor 21 on. When transistor 21 turns on the voltage and the current in coil 27 will be as indicated in FIG. 1. The currents $I_1$ (collector current to transistor 21) and $I_2$ (current through diode 29) are limited by the inductance of coil 27. Diode 29 is forward biased with the coil voltage appearing at point "A" which causes positive feedback to transistor 15 which drives it into a saturated condition. As the current $I_1$ builds up, transistor 21 reaches the maximum ability to support the current $I_1$ with the available base current. When this occurs, the collector voltage of transistor 21 goes positive or out of saturation and transistor 21 begins to turn off. When the collector voltage of transistor 21 goes positive diode 29 is back biased which turns off transistor 15 which then completely turns off transistor 21. The current passing through coil 27 is used to operate an electromechanical device such as a relay. The cycle is then repeated when the next trigger pulse $E_T$ is applied to the base of transistor 15.

The maximum current through coil 27 is determined by the choice of parameters of either or both of transistors 15 and 21, the degree of conductivity of diode 29 when forward biased, or the ratio of supply voltage B++ to the supply voltage B+ away from the nominal ratio of 2:1.

What I claim is:

1. A blocking oscillator comprising:
   a. first and second transistors each having a base, an emitter and a collector;
   b. the collector of said first transistor being operatively connected to the base of said second transistor;
   c. a positive feedback from said second transistor to said first transistor comprising means operatively connecting the collector of said second transistor to the base of said first transistor;
   d. one end of a load coil operatively connected to the collector of said second transistor;
   c. whereby the maximum current in said load coil inhibits the positive feedback from said second transistor to said first transistor;
   f. a first positive potential applied to the base and emitter of said first transistor;
   g. a second positive potential applied to the other end of said load coil; and
   h. the second positive potential is greater than said first positive potential and the ratio of said second positive potential to said first positive potential determines the maximum current flow through said load coil.
2. The device of claim 1 wherein:
   a. said means comprises a diode operatively connected between said second and first transistors.
3. The device of claim 2 wherein:
   a. said diode includes an anode and a cathode;
   b. the collector of said second transistor is operatively connected to the cathode of said diode and to one side of said load coil; and
   c. the anode of said diode is operatively connected to the base of said first transistor.
4. The device of claim 3 wherein:
   a. the base of said first transistor is operatively connected through a capacitor to a trigger pulse source; and
   b. whereby the trigger pulse from said trigger pulse source turns on said first and second transistors and the maximum current in said load coil renders said second transistor less conducting and back biases said diode which causes said first and second transistors to turn off.